(12) United States Patent
Dellock et al.

(10) Patent No.: US 9,607,534 B2
(45) Date of Patent: Mar. 28, 2017

(54) ILLUMINATING PRISMATIC BADGE FOR A VEHICLE

(71) Applicant: Ford Global Technologies, LLC, Dearborn, MI (US)

(72) Inventors: Paul Kenneth Dellock, Northville, MI (US); Stuart C. Salter, White Lake, MI (US); Cornel Lewis Gardner, Romulus, MI (US); Michael A. Musleh, Canton, MI (US); Brian Siler, Richmond, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 316 days.

(21) Appl. No.: 14/606,410

(22) Filed: Jan. 27, 2015

(65) Prior Publication Data

US 2015/0154896 A1    Jun. 4, 2015

Related U.S. Application Data

(63) Continuation-in-part of application No. 14/519,914, filed on Oct. 21, 2014, which is a continuation-in-part of application No. 14/086,442, filed on Nov. 21, 2013.

(51) Int. Cl.
| | |
|---|---|
| *F21S 8/10* | (2006.01) |
| *F21V 21/00* | (2006.01) |
| *G09F 21/04* | (2006.01) |
| *F21S 10/02* | (2006.01) |
| *B60Q 1/50* | (2006.01) |
| *B60R 13/00* | (2006.01) |
| *F21V 3/04* | (2006.01) |

(52) U.S. Cl.
CPC ............... *G09F 21/04* (2013.01); *B60Q 1/50* (2013.01); *B60R 13/005* (2013.01); *F21S 10/023* (2013.01); *F21V 3/049* (2013.01)

(58) Field of Classification Search
CPC ........ B60Q 1/50; B60R 13/005; F21S 10/023; G09F 13/04; G09F 21/04; G09F 21/048
USPC .......................... 362/487, 496, 509–510, 545
See application file for complete search history.

(56) References Cited

U.S. PATENT DOCUMENTS

| | | |
|---|---|---|
| 6,729,738 B2 | 5/2004 | Fuwausa et al. |
| 6,773,129 B2 | 8/2004 | Anderson, Jr. et al. |
| 6,871,986 B2 | 3/2005 | Yamanaka et al. |
| 6,990,922 B2 | 1/2006 | Ichikawa et al. |
| 7,213,923 B2 | 5/2007 | Liu et al. |
| 7,264,366 B2 | 9/2007 | Hulse |
| 7,264,367 B2 | 9/2007 | Hulse |
| 7,753,541 B2 | 7/2010 | Chen et al. |
| 8,016,465 B2 | 9/2011 | Egerer et al. |
| 8,203,260 B2 | 6/2012 | Li et al. |

(Continued)

FOREIGN PATENT DOCUMENTS

| | | |
|---|---|---|
| CN | 201169230 Y | 12/2008 |
| CN | 201193011 Y | 2/2009 |

(Continued)

*Primary Examiner* — Jason Moon Han
(74) *Attorney, Agent, or Firm* — Jason C. Rogers; Price Heneveld LLP

(57) ABSTRACT

A badge mounted on a vehicle is provided herein. The badge includes a housing having a viewable portion. A light source is disposed inside the housing and is configured to direct light toward the viewable portion. Light emitted from the light source illuminates in a plurality of colors which may create a prismatic appearance.

18 Claims, 7 Drawing Sheets

(56) References Cited

U.S. PATENT DOCUMENTS

| | | |
|---|---|---|
| 8,408,766 B2 | 4/2013 | Wilson et al. |
| 8,466,438 B2 | 6/2013 | Lambert et al. |
| 8,519,362 B2 | 8/2013 | Labrot et al. |
| 8,606,430 B2 | 12/2013 | Seder et al. |
| 2003/0179548 A1 | 9/2003 | Becker et al. |
| 2004/0213088 A1 | 10/2004 | Fuwausa |
| 2006/0087826 A1 | 4/2006 | Anderson, Jr. |
| 2009/0219730 A1 | 9/2009 | Syfert et al. |
| 2012/0001406 A1 | 1/2012 | Paxton et al. |
| 2013/0335994 A1 | 12/2013 | Mulder et al. |

FOREIGN PATENT DOCUMENTS

| | | |
|---|---|---|
| DE | 29708699 U1 | 7/1997 |
| DE | 10319396 A1 | 11/2004 |
| EP | 1793261 A1 | 6/2007 |
| EP | 2778209 A1 | 9/2014 |
| JP | 2000159011 A | 6/2000 |
| WO | 2006047306 A1 | 5/2006 |
| WO | 2014068440 A1 | 5/2014 |

ILLUMINATING PRISMATIC BADGE FOR A VEHICLE

CROSS-REFERENCE TO RELATED APPLICATIONS

This application is a continuation-in-part of U.S. patent application Ser. No. 14/519,914, filed Oct. 21, 2014, and entitled "ILLUMINATING BADGE FOR A VEHICLE" which is a continuation-in-part of U.S. patent application Ser. No. 14/086,442, filed Nov., 21, 2013, and entitled "VEHICLE LIGHTING SYSTEM WITH PHOTOLUMINESCENT STRUCTURE." The aforementioned related applications are hereby incorporated by reference as if fully set forth herein.

FIELD OF THE INVENTION

The present disclosure generally relates to vehicle lighting systems, and more particularly, to vehicle lighting systems employing one or more photoluminescent structures.

BACKGROUND OF THE INVENTION

Illumination arising from the use of photoluminescent structures offers a unique and attractive viewing experience. It is therefore desired to implement such structures in automotive vehicles for various lighting applications.

SUMMARY OF THE INVENTION

According to one aspect of the present invention, a badge for a vehicle is disclosed. The badge includes a housing having a viewable portion. First and second light sources are disposed inside the housing and each light source is configured to direct light toward the viewable portion. The viewable portion is configured to illuminate in a plurality of colors from the first light source. Light emitted from the second light source illuminates in a second color on the viewable portion.

According to another aspect of the present invention, a badge is disclosed. The badge includes a viewable portion. A first light source is configured to emit light toward the viewable portion. A second light source is configured to pulse light toward the viewable portion. The viewable portion is configured to luminesce in response to excitation by light emitted from the first light source. Pulsed light emitted from the second light source produces a plurality of colors on the viewable portion.

According to another aspect of the present invention, a badge is disclosed. The badge includes a housing having a viewable portion. First and second light sources are disposed inside the housing and each light source is configured to direct light toward the viewable portion of the badge. Portions of the viewable portion are configured to glow in a first color and flash a second color that is visually distinct from the first color.

These and other aspects, objects, and features of the present invention will be understood and appreciated by those skilled in the art upon studying the following specification, claims, and appended drawings.

DETAILED DESCRIPTION OF THE PREFERRED EMBODIMENTS

As required, detailed embodiments of the present invention are disclosed herein. However, it is to be understood that the disclosed embodiments are merely exemplary of the invention that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present invention.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The following disclosure describes an illuminating badge for a vehicle. The badge may advantageously employ one or more multicolored light sources configured to illuminate in a plurality of colors at pre-defined frequencies. The badge may further include one or more photoluminescent structures configured to convert light received from an associated light source and re-emit the light at a different wavelength typically found in the visible spectrum.

Figure 1A:
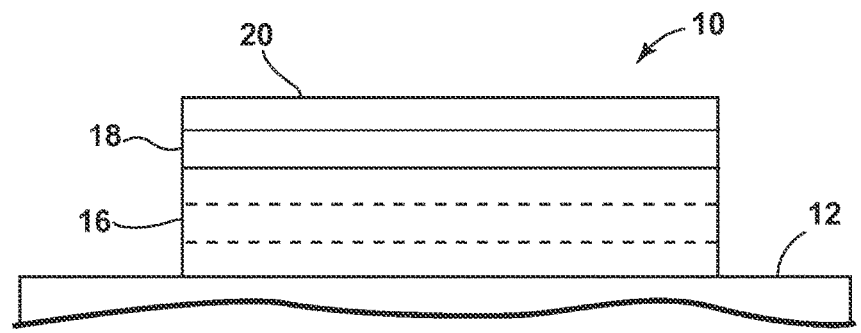
FIG. 1A is a side view of a photoluminescent structure rendered as a coating for use in a luminescent trim light assembly according to one embodiment.
Figure 1B:
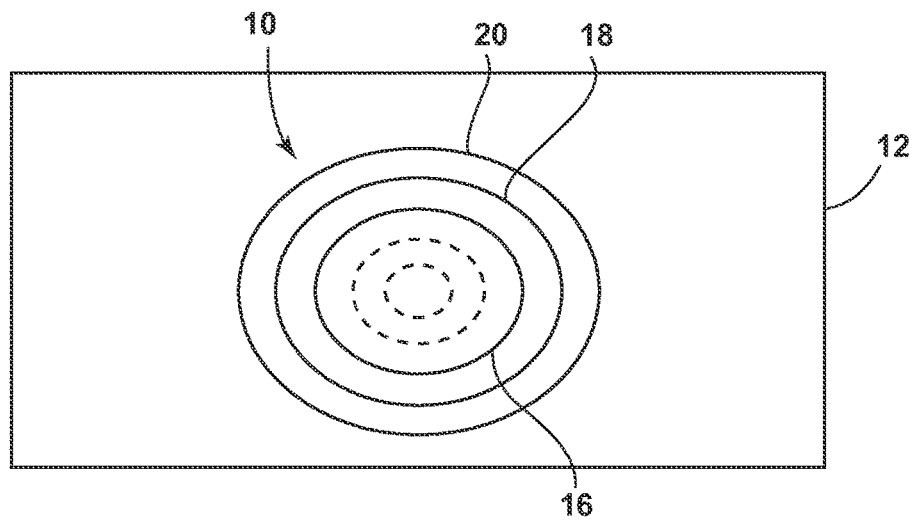
FIG. 1B is a top view of a photoluminescent structure rendered as a discrete particle according to one embodiment.
Figure 1C:
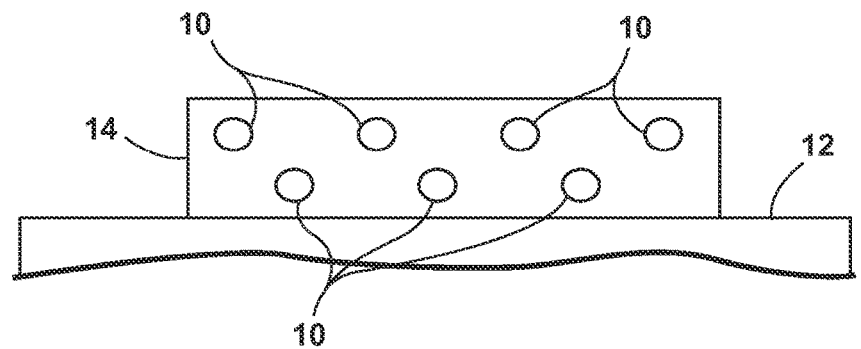
FIG. 1C is a side view a plurality photoluminescent structures rendered as discrete particles and incorporated into a separate structure.

Referring to FIGS. 1A-1C, various exemplary embodiments of photoluminescent structures 10 are shown, each capable of being coupled to a substrate 12, which may correspond to a vehicle fixture or vehicle related piece of equipment. In FIG. 1A, the photoluminescent structure 10 is generally shown rendered as a coating (e.g. a film) that may be applied to a surface of the substrate 12. In FIG. 1B, the photoluminescent structure 10 is generally shown as a discrete particle capable of being integrated with a substrate 12. In FIG. 1C, the photoluminescent structure 10 is generally shown as a plurality of discrete particles that may be incorporated into a support medium 14 (e.g. a film) that may then be applied (as shown) or integrated with the substrate 12.

At the most basic level, a given photoluminescent structure 10 includes an energy conversion layer 16 that may include one or more sub layers, which are exemplarily shown through broken lines in FIGS. 1A and 1B. Each sub layer of the energy conversion layer 16 may include one or more photoluminescent materials having energy converting elements with phosphorescent or fluorescent properties. Each photoluminescent material may become excited upon receiving light of a specific wavelength, thereby causing the light to undergo a conversion process. Under the principle of down conversion, the inputted light is converted into a longer wavelength light that is outputted from the photoluminescent structure 10. Conversely, under the principle of up conversion, the inputted light is converted into a shorter wavelength light that is outputted from the photoluminescent structure 10. When multiple distinct wavelengths of light are outputted from the photoluminescent structure 10 at the same time, the wavelengths of light may mix together and be expressed as a multicolor light.

In some embodiments, light that has been down converted or up converted may be used to excite other photoluminescent material(s) found in the energy conversion layer 16. The process of using converted light outputted from one photoluminescent material to excite another, and so on, is generally known as an energy cascade and may serve as an alternative for achieving various color expressions. With respect to either conversion principle, the difference in wavelength between the exciting light and the converted light is known as the Stokes shift and serves as the principle driving mechanism for an energy conversion process corresponding to a change in wavelength of light. In the various implementations discussed herein, each of the photoluminescent structures may operate under either conversion principle.

The energy conversion layer 16 may be prepared by dispersing the photoluminescent material in a polymer matrix to form a homogenous mixture using a variety of methods. Such methods may include preparing the energy conversion layer 16 from a formulation in a liquid carrier medium and coating the energy conversion layer 16 to a desired substrate. The energy conversion layer 16 may be applied to a substrate by painting, screen printing, spraying, slot coating, dip coating, roller coating, and bar coating. Alternatively, the energy conversion layer 16 may be prepared by methods that do not use a liquid carrier medium. For example, the energy conversion layer 16 may be rendered by dispersing the photoluminescent material into a solid state solution (homogenous mixture in a dry state) that may be incorporated in a polymer matrix, which may be formed by extrusion, injection molding, compression molding, calendaring, thermoforming, etc. The energy conversion layer 16 may then be integrated into a substrate using any methods known to those skilled in the art. When the energy conversion layer 16 includes sub layers, each sub layer may be sequentially coated to form the energy conversion layer 16. Alternatively, the sub layers can be separately prepared and later laminated or embossed together to form the energy conversion layer 16. Alternatively still, the energy conversion layer 16 may be formed by coextruding the sub layers.

Referring back to FIGS. 1A and 1B, the photoluminescent structure 10 may optionally include at least one stability layer 18 to protect the photoluminescent material contained within the energy conversion layer 16 from photolytic and thermal degradation. The stability layer 18 may be configured as a separate layer optically coupled and adhered to the energy conversion layer 16. Alternatively, the stability layer 18 may be integrated with the energy conversion layer 16. The photoluminescent structure 10 may also optionally include a protection layer 20 optically coupled and adhered to the stability layer 18 or other layer (e.g. the conversion layer 16 in the absence of the stability layer 18) to protect the photoluminescent structure 10 from physical and chemical damage arising from environmental exposure. The stability layer 18 and/or the protective layer 20 may be combined with the energy conversion layer 16 through sequential coating or printing of each layer, sequential lamination or embossing, or any other suitable means.

Additional information regarding the construction of photoluminescent structures is disclosed in U.S. Pat. No. 8,232,533 to Kingsley et al., entitled "PHOTOLYTICALLY AND ENVIRONMENTALLY STABLE MULTILAYER STRUCTURE FOR HIGH EFFICIENCY ELECTROMAGNETIC ENERGY CONVERSION AND SUSTAINED SECONDARY EMISSION," filed Jul. 31, 2012, the entire disclosure of which is incorporated herein by reference. For additional information regarding fabrication and utilization of photoluminescent materials to achieve various light emissions, refer to U.S. Pat. No. 8,207,511 to Bortz et al., entitled "PHOTOLUMINESCENT FIBERS, COMPOSITIONS AND FABRICS MADE THEREFROM," filed Jun. 26, 2012; U.S. Pat. No. 8,247,761 to Agrawal et al., entitled "PHOTOLUMINESCENT MARKINGS WITH FUNCTIONAL OVERLAYERS," filed Aug. 21, 2012; U.S. Pat. No. 8,519,359 B2 to Kingsley et al., entitled "PHOTOLYTICALLY AND ENVIRONMENTALLY STABLE MULTILAYER STRUCTURE FOR HIGH EFFICIENCY ELECTROMAGNETIC ENERGY CONVERSION AND SUSTAINED SECONDARY EMISSION," filed Aug. 27, 2013; U.S. Pat. No. 8,664,624 B2 to Kingsley et al., entitled "ILLUMINATION DELIVERY SYSTEM FOR GENERATING SUSTAINED SECONDARY EMISSION," filed Mar. 4, 2014; U.S. Patent Publication No. 2012/0183677 to Agrawal et al., entitled "PHOTOLUMINESCENT COMPOSITIONS, METHODS OF MANUFACTURE AND NOVEL USES," filed Jul. 19, 2012; U.S. Patent Publication No. 2014/0065442 A1 to Kingsley et al., entitled "PHOTOLUMINESCENT OBJECTS," filed Mar. 6, 2014; and U.S. Patent Publication No. 2014/0103258 A1 to Agrawal et al., entitled "CHROMIC LUMINESCENT COMPOSITIONS AND TEXTILES," filed Apr. 17, 2014, all of which are incorporated herein by reference in their entirety.

Figure 2:
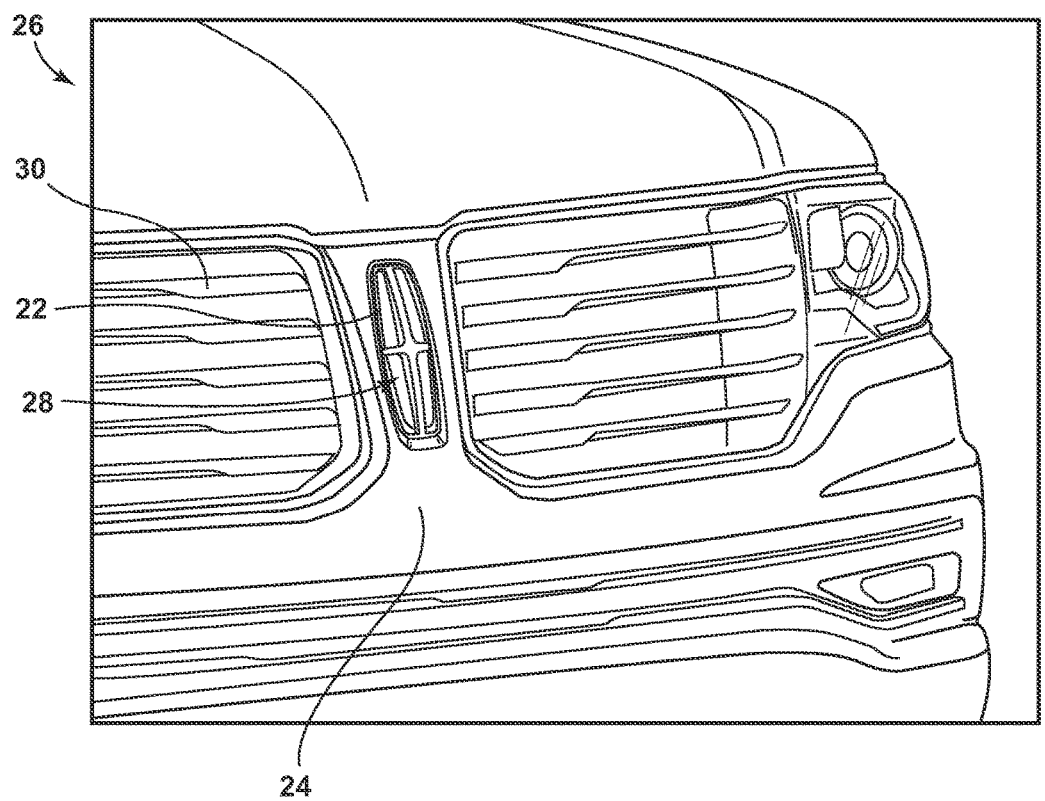
FIG. 2 illustrates a badge mounted to a front portion of a vehicle.

Referring to FIG. 2, a badge 22 is generally shown mounted on a front end 24 of a vehicle 26. In other embodiments, the badge 22 may be located elsewhere, such as, but not limited to, the rear end or side(s) of the vehicle 26. The badge 22 may be configured as an insignia that is presented as an identifying mark of a vehicle manufacturer and includes a viewable portion 28 that is generally prominently displayed on the vehicle 26. In the presently illustrated embodiment, the badge 22 is disposed proximate a grille assembly 30 in a central location of the front end 24, thus allowing the badge 22 to be readily viewed by an observer looking head on at the vehicle 26. As will be described below in greater detail, the badge 22 may illuminate and sparkle (i.e., shine brightly with flashes of light of a plurality of colors) to provide a distinct styling element to the vehicle 26.

Figure 3:
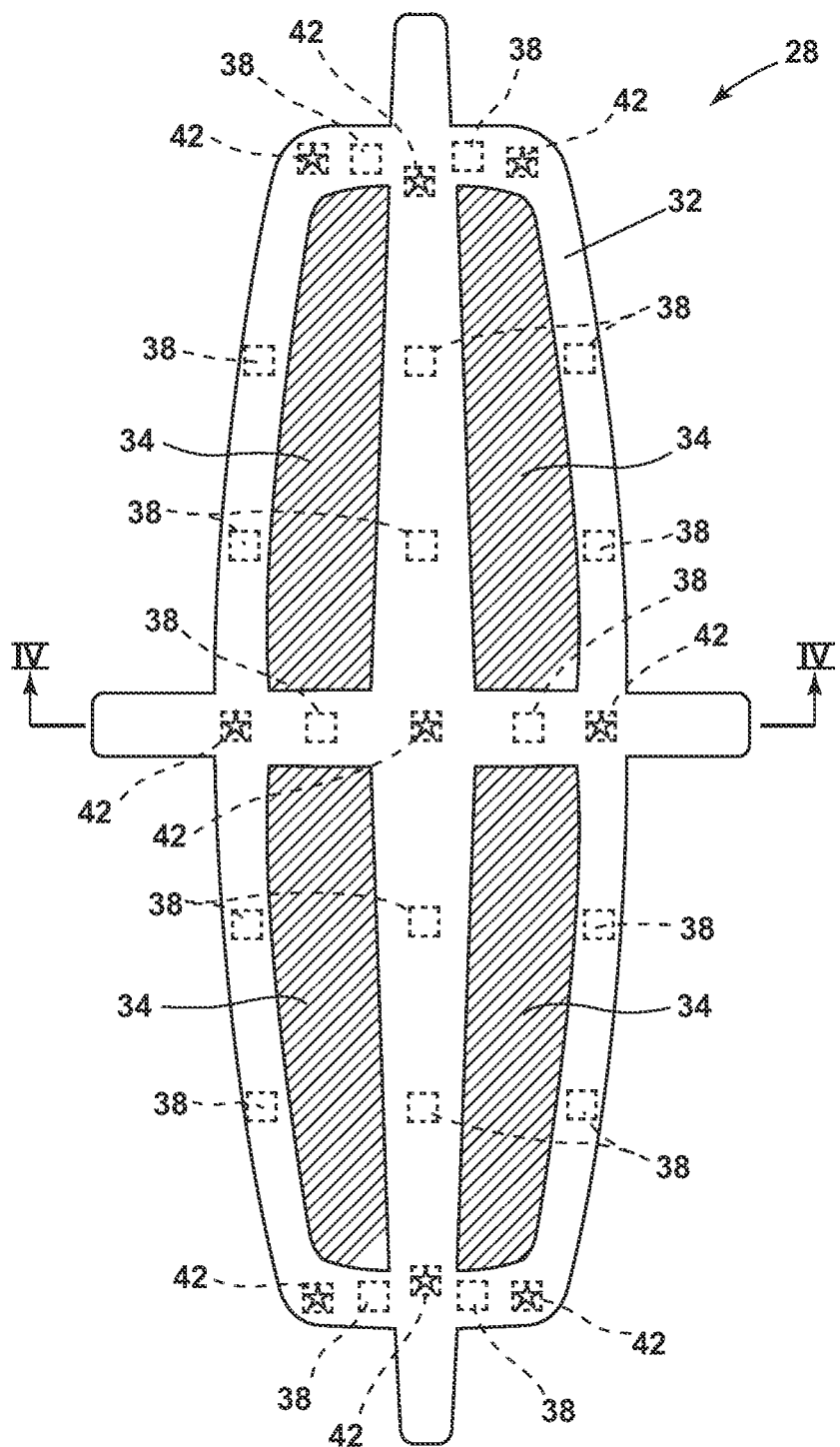
FIG. 3 is a front view of the badge according to one embodiment.

Referring to FIG. 3, the viewable portion 28 of the badge 22 is exemplarily shown according to one embodiment. The viewable portion 28 may include transparent and/or translucent portion 32 and substantially opaque portions 34, which may be configured as opaque coatings applied to the viewable portion 28. In alternative embodiments, portions 34 may be left open to the front end 24 of the vehicle 26. The viewable portion 28 may also include a photoluminescent portion 36 (see FIG. 4) coupled to the underside of the viewable portion 28 and configured to luminesce in response to excitation by light emitted from one or more light sources 38 disposed inside the badge 22 and positioned below the photoluminescent portion 36. The light sources 38 may be configured as light emitting diodes (LEDs) emitting a wavelength of light that is characterized as ultraviolet light (~10-400 nanometers in wavelength), violet light (~380-450 nanometers in wavelength), or blue light (~450-495 nanometers in wavelength) to take advantage of the relative low cost attributable to those types of LEDs.

According to one embodiment, light emitted from light sources 38 is converted by the photoluminescent portion 36 into light of a longer wavelength and outputted therefrom. The converted light corresponds to a visible light, which includes the portion of the electromagnetic spectrum that can be detected by the human eye (~390-700 nanometers in wavelength) and may be expressed in a variety of colors defined by a single wavelength (e.g., red, green, blue) or a mixture of multiple wavelengths (e.g., white). Thus, it should be understood that the photoluminescent portion 36 may be configured such that converted light outputted therefrom is capable of being expressed as unicolored or multicolored light. According to one embodiment, light sources 38 are configured to emit blue light and the photoluminescent portion 36 is configured to convert the blue light into a neutral white light having a color temperature of approximately 4000K to 5000K. The converted light escapes from the badge 22 via portion 32, thereby causing portion 32 to glow. To obtain a uniform illumination of portion 32, light sources 38 may be configured to emit non-focused light and are spaced accordingly inside the badge 22 to provide an even distribution of light for exciting the photoluminescent portion 36.

In addition to illuminating, portion 32 may be configured to sparkle at one or more locations, as is graphically illustrated in FIG. 3 by stars. The locations may be chosen to correspond to a corner or edge of portion 32. The sparkle effect at each location may be produced by light emitted from a corresponding light source 42 that is disposed inside the badge 22 and positioned below the photoluminescent portion 36 in relative proximity to the sparkle location. Each light source 42 may be operated to pulse light onto the corresponding sparkle location. According to one implementation, a pulse of light from a given light source 42 may last approximately 1/10 to 1/100 of a second and light sources 42 may be pulsed randomly or in a pattern. Additionally, a variable current may be supplied to each light source 42 to adjust the degree of illumination for each sparkle. For example the current may vary from 1 to 5 times the steady state current. Moreover, any light source 42 disposed within the badge 22 may illuminate in a plurality of colors, as will be described in more detail below.

Light sources 42 may be configured as LEDs emitting a wavelength of light that does not excite the photoluminescent portion 36 and is instead transmitted through the photoluminescent portion 36 to directly illuminate the corresponding sparkle locations on portion 32. Alternatively, portions of the photoluminescent portion 36 located above light sources 42 may be cut out to allow light emitted from light sources 42 to directly illuminate the corresponding sparkle locations without having to pass through the photoluminescent portion 36. Light sources 42 may be chosen such that light emitted therefrom is relatively brighter than the luminescence exhibited by the photoluminescent portion 36 to allow the sparkles to be more apparent to onlookers. For instance, where the photoluminescent portion 36 luminesces in a neutral white color as in the embodiment described above, light sources 38 may be configured to emit cool white light having a color temperature of approximately 6000K to 6500K.

Figure 4:
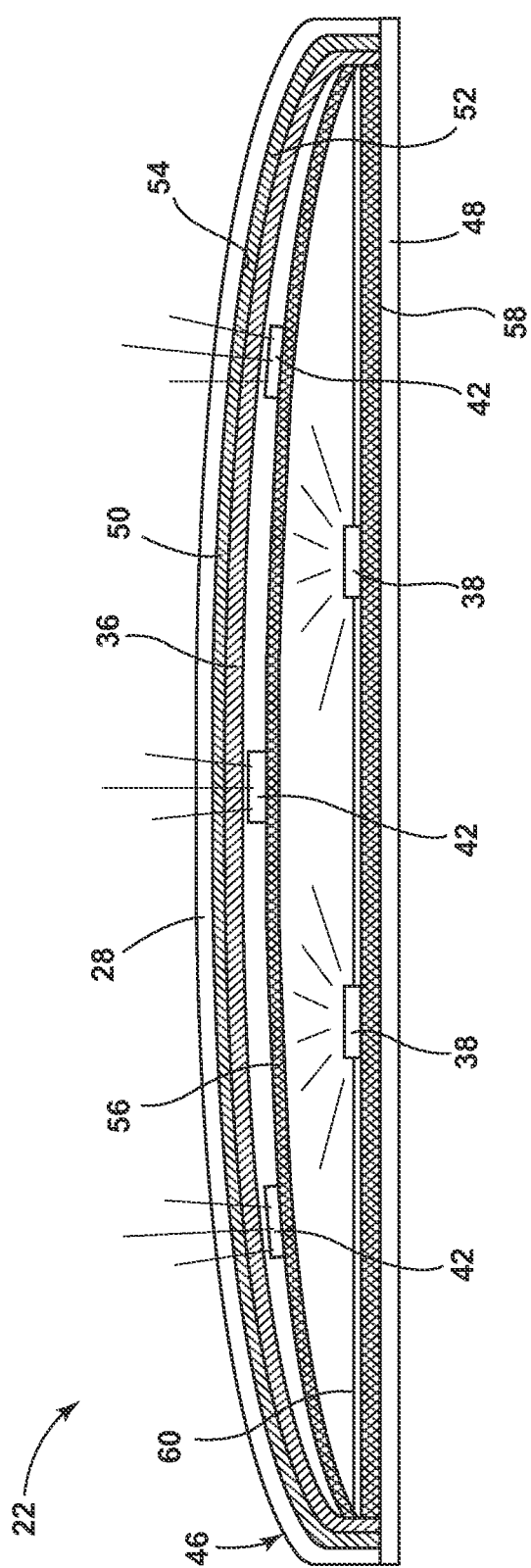
FIG. 4 is a cross-sectional view of the badge taken along lines IV-IV of FIG. 3 having a luminescent portion and disposed proximate a viewing portion.

Referring to FIG. 4, a cross-sectional view of the badge 22 is shown according to one embodiment. The badge 22 includes a housing 46 having the viewable portion 28 described above and a rear portion 48 that is capable of being secured to a vehicle 26. The viewable portion 28 may be arcuate whereas the rear portion 48 may be substantially linear. Each portion 28, 48 may be constructed from a rigid material such as, but not limited to, plastic and may be assembled together via sonic or laser welding. Alternatively, portions 28 and 48 may be assembled together via low-pressure insert molding.

With respect to the illustrated embodiment, the viewable portion 28 may be metalized to give the badge 22 a metallic outer appearance. For example, a metallic layer 50 may be applied to the underside of the viewable portion 28 via partial vacuum deposition. The metallic layer 50 should be transparent and/or translucent to allow light to pass there through from an inner side 52 to an outer side 54. According to one embodiment, the photoluminescent portion 36 covers the metallic layer 50 and may be applied over the metallic layer 50 as a paint or other coating. In an alternative embodiment, the photoluminescent portion 36 may be molded or otherwise integrated into the viewable portion 28 of the housing 46.

Referring still to FIG. 4, light sources 42 may be provided on a flexible printed circuit board (PCB) 56 that is secured inside the housing 46 and positioned proximate to the viewable portion 28. Light sources 42 may each be positioned directly below the corresponding sparkle locations and pulse light toward the corresponding sparkle locations to produce brilliant flashes of light. Optionally, light sources 42 may include focusing optics to help concentrate light onto the corresponding sparkle locations. With respect to the illustrated embodiment, the PCB 56 should be substantially transparent and/or translucent to allow light emitted from light sources 42 to be transmitted there through to excite the photoluminescent portion 36. As shown, light sources 38 may be positioned relatively further away from the viewable portion 28 to allow for a greater distribution of light toward the photoluminescent portion 36. For example, light sources 38 may be provided on a PCB 58 that is secured to the rear portion 48. The PCB 58 may include a white solder mask 60 to reflect light incident thereon.

According to one embodiment, the photoluminescent portion 36 is substantially Lambertian, that is, the apparent brightness of the photoluminescent portion 36 is substantially constant regardless of an observer's angle of view. As a consequence, converted light may be emitted outwardly from the photoluminescent portion 36 in numerous directions. With respect to the embodiment shown in FIG. 4, a portion of the converted light may be transmitted through the metallic layer 50 and outputted from portion 32 of the viewable portion 28. Another portion of the converted light may be emitted into the interior of the housing 46 and become incident on the white solder mask 60 of the PCB 58.

As a result, the converted light may be redirected back toward the photoluminescent portion 36 and transmitted there through before finally being outputted from the housing 46 via portion 32 of the viewable portion 28. This helps to ensure that the viewable portion 28 exhibits an optimal amount of luminescence. Furthermore, the provision of the white solder mask 60 on PCB 58 also helps to ensure that an optimal amount of light emitted from light sources 42 reaches the photoluminescent portion 36. For example, it is possible for a portion of the light emitted from one or more of the light sources 42 to reflect off the photoluminescent portion 36, thereby resulting in decreased excitation of the photoluminescent portion 36. Thus, by providing a means to redirect the light back toward the photoluminescent portion 36, wayward propagating light originating from light sources 42 and contained inside the housing 46 is given another opportunity to excite the photoluminescent portion 36.

Figure 5:
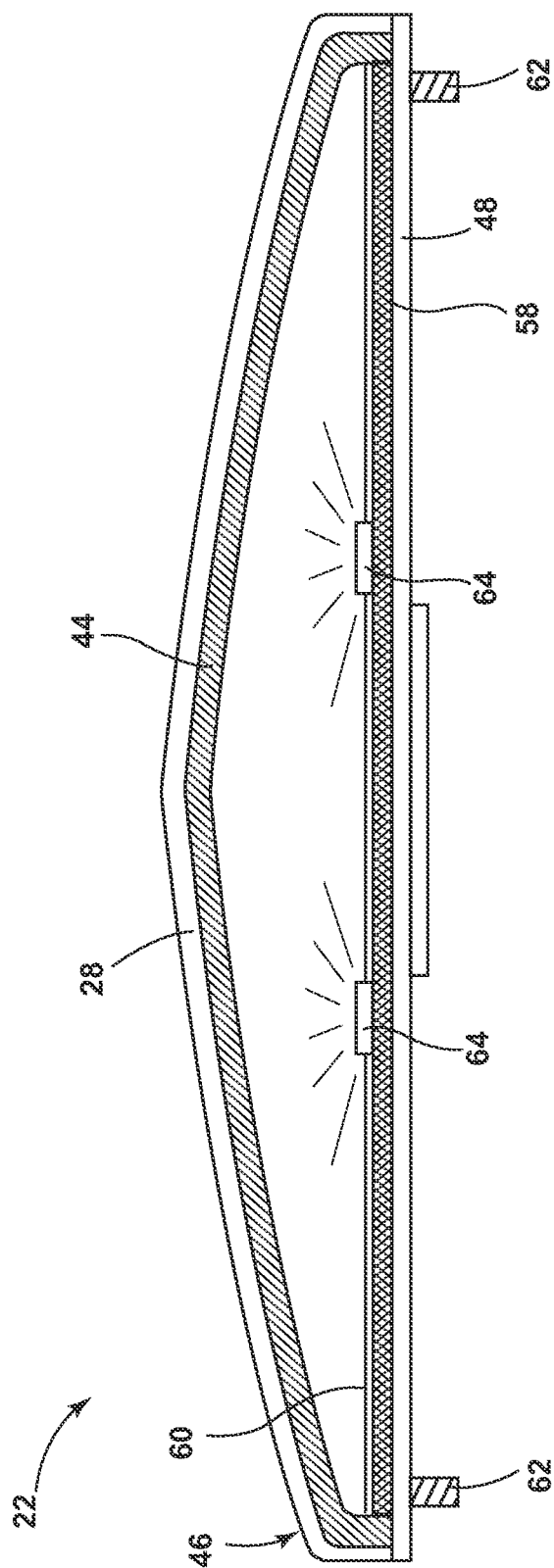
FIG. 5 illustrates a cross-sectional view of an alternate embodiment of the badge taken along lines IV-IV of FIG. 3 having a light source that illuminates in a plurality of colors.

Referring to FIG. 5, a cross-sectional view of the badge 22 is shown according to an alternate embodiment. The badge 22 includes a housing 46 having the viewable portion 28, as described above, and a rear portion 48 that is capable of being secured to a vehicle 26 through attachment points 62. Any practicable means may be used for attaching the badge 22 to the vehicle 26 including any known process for flushly mounting the badge 22 onto a vehicle 26. The viewable portion 28 may appear substantially prismatic such that the badge 22 is configured to resemble the colors formed by refraction of light through a prism. The rear portion 48 may be substantially linear and may be a dark, high gloss material, thereby concealing any circuitry of the badge 22 and attachment points 62.

The badge 22 contains multicolored light sources 64 that are configured to illuminate in a plurality of colors, such as an RGB LED having separate red, green and blue LED chips therein. The multicolored light sources 64 are disposed at discrete locations around the badge 22. Each multicolored light source 64 may be operated to pulse differing colors of light at predefined locations within the badge 22.

According to one embodiment, a pulse of light of a first color from a given multicolored light source 64 may last a short period of time approximately $\frac{1}{50}$ to $\frac{1}{100}$ of a second. Next, a pulse of light of a second color from the multicolored light source 64 may last a short period of time approximately $\frac{1}{50}$ to $\frac{1}{100}$ of a second. This process may continue through a plurality of colors by each multicolored light source 64. Each multicolored light source 64 may be pulsed randomly or in any pre-defined pattern of colors. Additionally, a variable electrical current may be supplied to each multicolored light source 64 to adjust the degree of illumination for each pulse of colored and/or white light. For example, the current may vary from 1 to 5 times the steady state current. Through the use of multicolored light sources 64, each pulsating different colors at different times, it is possible for the badge 22 to have a prismatic appearance, meaning the badge 22 may appear to resemble the colors formed by refraction of light through a prism.

In an alternative embodiment, one multicolored light source 64 may flash a string of colors, as described above, while any remaining light sources 38 or multicolored light sources 64 disposed within the badge 22 emit white light. The multicolored light sources 64 may produce white light during steady state by illuminating each individual light emitting diode disposed within the multicolored light source 64 concurrently. Furthermore, the light sources 38 emitting white light may remain at a constant color and brightness, or may flicker.

A light diffuser 44 is molded, or alternatively mounted, between the viewable portion 28 of the housing 46 and the multicolored light source 64. For example, the light diffuser 44 may be a layer that is applied to the underside of the viewable portion 28 via partial vacuum deposition. The diffuser 44 can be clear, translucent, or opaque, including colored and generally functions to diffuse the light from the multicolored light sources 64 so that hot spots and shadows are eliminated. The inner surface and/or outer surface of the badge 22 may be coated, roughened or receive microfaceting to aid in the light diffusion performance. Additionally, the diffuser 44 can also be curved, such as the outwardly curving or concave shape shown in FIG. 5 in order to optimize the light diffusing effect. In alternate embodiments, a light diffusing material may be applied to or disposed on some or all of the light sources 38 disposed within the badge 22.

Figure 6:
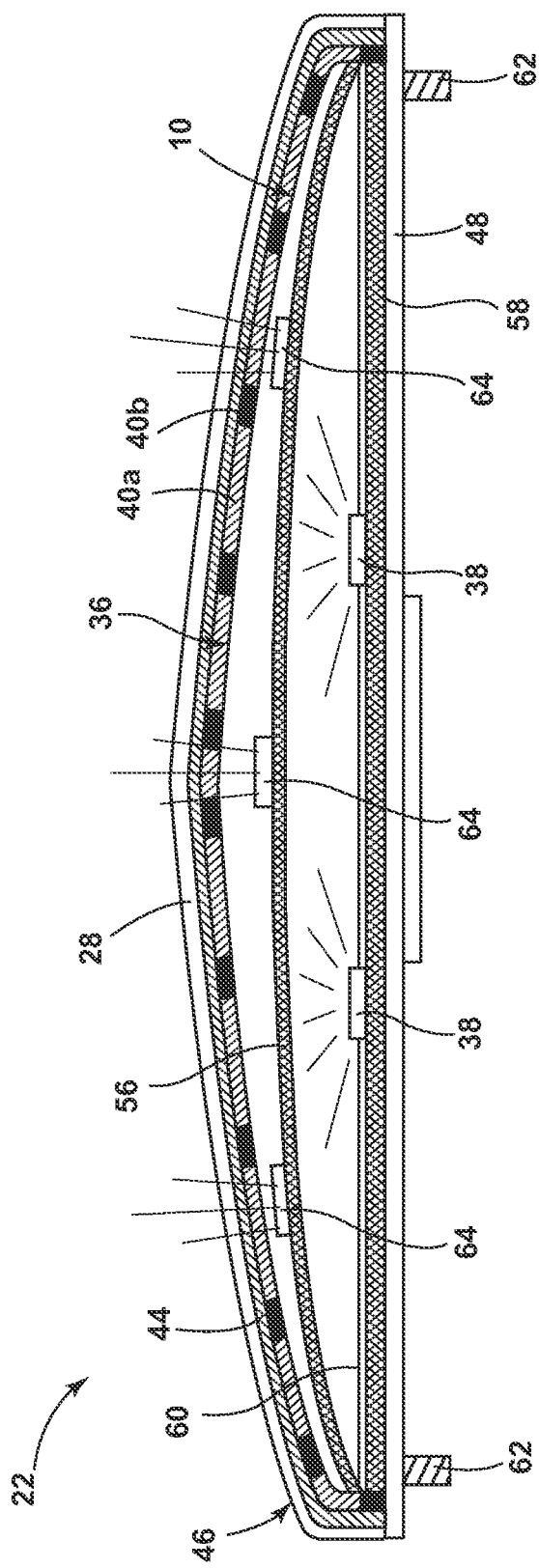
FIG. 6 illustrates a cross-sectional view of an alternate embodiment of the badge taken along lines IV-IV of FIG. 3 having a first light source for rapidly flashing a plurality of colors and a second light source for exciting a photoluminescent portion.

Referring to FIG. 6, a cross-sectional view of the badge 22 is shown according to one embodiment. A light diffuser 44 covers the photoluminescent portion 36. The photoluminescent portion 36 may be applied to a surface of the light diffuser 44 as a paint or other coating. In an alternative embodiment, the light diffuser 44 and/or the photoluminescent portion 36 may be molded or otherwise integrated into the viewable portion 28 of the housing 46.

Multicolored light sources 64 may be provided on a flexible PCB 56 that is secured inside the housing 46 and positioned proximate to the viewable portion 28. Multicolored light sources 64 may each be positioned directly below the corresponding sparkle locations, as described above, and pulse light toward the corresponding sparkle locations to produce flashes of light in a plurality of colors thereby producing unique aesthetic features, such as making the badge 22 appear prismatic. Optionally, multicolored light sources 64 may include focusing optics to help concentrate light onto the corresponding sparkle locations. As discussed above, the PCB 56 should be substantially transparent and/or translucent to allow light emitted from light sources 38 to be transmitted therethrough to excite the photoluminescent portion 36.

As shown, light sources 38 may be positioned relatively further away from the viewable portion 28 to allow for a greater distribution of light toward the photoluminescent portion 36. For example, light sources 38 may be provided on a PCB 58 that is secured to the rear portion 48. The PCB 58 may include a white solder mask 60 to reflect light incident thereon. The larger relative distance of light sources 38 as compared to multicolored light sources 64 may also help provide an appearance of more depth within the badge 22.

According to one embodiment, the photoluminescent portion 36 contains first and second photoluminescent sections 40a, 40b containing differing photoluminescent structures 10 excitable by light at a different wavelength in an interlaced or striped pattern. Each photoluminescent section may be in any direction and of any practicable width to create any desired lighting effect. Through the use of a striped pattern, it is possible for the combined light emitted from the first and second photoluminescent sections 40a, 40b to appear as a homogenous color.

Additional photoluminescent sections may be interlaced within the badge 22. The additional photoluminescent sections may be excited individually by the light source 38 or in combination with the first and second photoluminescent sections 40a, 40b to create a wide range of colors and effects. Additionally, light source 38 may vary the intensity of light emitted therefrom based on a pre-defined event such as whether the vehicle 26 is being operated during the day or at night, or any other data obtained within the vehicle 26.

In operation, light sources 38 may emit light at a first and second wavelength, thereby exciting the first and second photoluminescent sections 40*a*, 40*b*. The light emitted from the first and second photoluminescent sections 40*a*, 40*b* may blend thereby emitting a substantially white light. In an alternative embodiment, the first and second photoluminescent sections 40*a*, 40*b* may blend in any color necessary to remove any natural color hue of the badge 22 based on the material used to create the badge 22. For example, plastics such as polycarbonate may naturally have a yellowish hue. However, this hue may be masked through the use of photoluminescent structures 10 thereby making the badge 22 illuminate and appear in any desired color. Alternatively, any type of light source, multicolored 64 or white 38, may be utilized to make the badge 22 illuminate in any desired color.

As the photoluminescent structure 10 is excited thereby illuminating portions of the badge 22 in a first color, some or all of the multicolored light sources 64 may randomly illuminate in a plurality of colors making the badge 22 appear prismatic. Each multicolored light source 64 may alternate between pulsating a plurality of colors and an off state. Alternatively, each multicolored light source 64 may alternate between a flashing of a plurality of colors and a state in which the multicolored light source 64 emits white light. Alternatively still, it is contemplated, that each multicolored light source 64 may alternate between any combination of flashing a plurality of colors, emitting white light, and emitting no light. In an alternate embodiment, the multicolored light sources 64 may individually illuminate at unique, pre-defined intervals while every other light source within the badge 22 is maintained in an off state.

Figure 7:
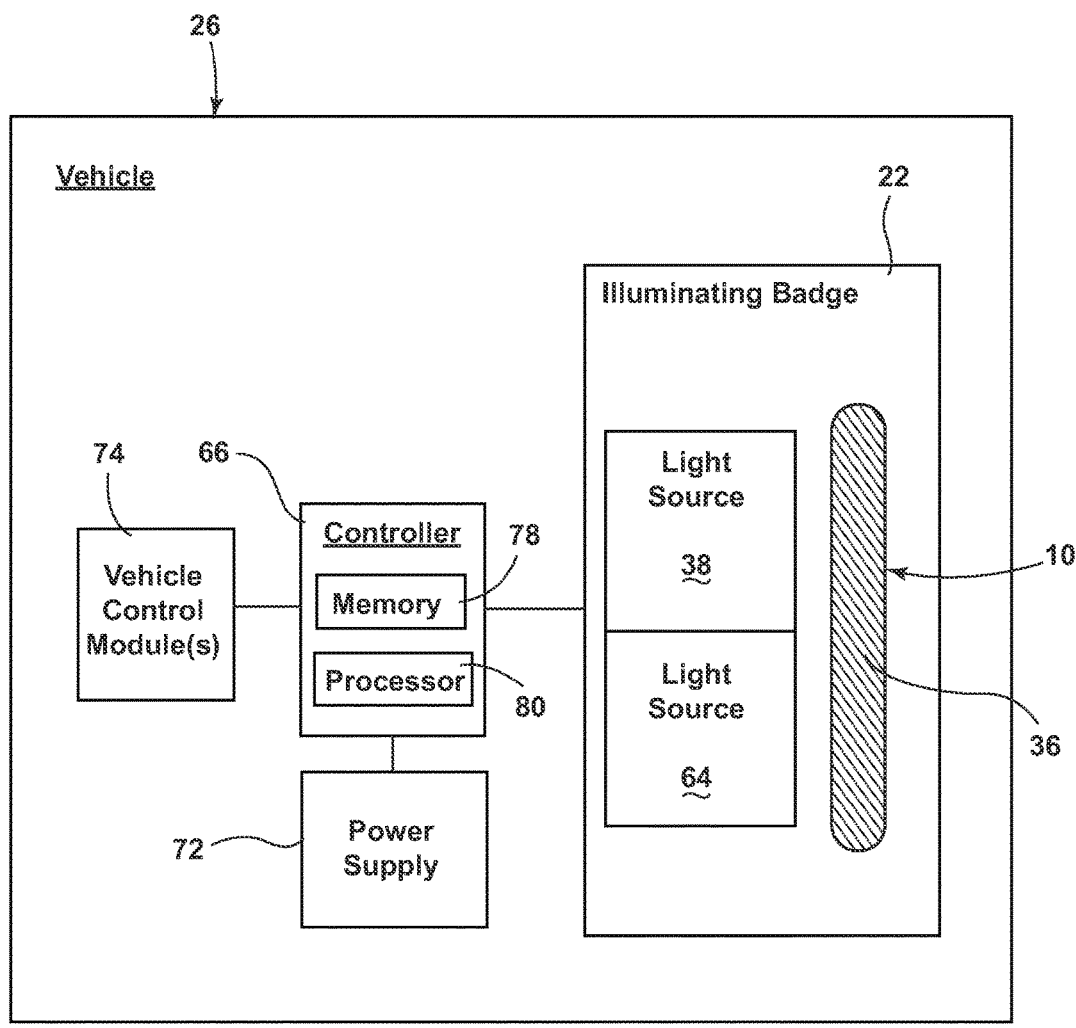
FIG. 7 is a block diagram of the illuminating prismatic badge.

Referring to FIG. 7, a box diagram of a vehicle 26 is shown in which a prismatic badge 22 is implemented. The badge 22 includes a controller 66 in communication with the light sources 38, 64. The controller 66 may include memory 78 having instructions contained therein that are executed by a processor 80 of the controller 66. The controller 66 may provide electrical power to the light source via a power supply 72 located onboard the vehicle 26. In addition, the controller 66 may be configured to control the light output of each light sources 38, 64 based on feedback received from one or more vehicle control modules 74 such as, but not limited to, a body control module, engine control module, steering control module, brake control module, the like, or a combination thereof. By controlling the light output of the light source 38, 64, the badge 22 may illuminate in a variety of colors and/or patterns to provide an aesthetic appearance, such as a prismatic appearance, or may provide vehicle information to an intended observer. For example, the illumination provided by the badge 22 may be used for numerous vehicle applications, such as, but not limited to, a car finding feature, a remote start indicator, a door lock indicator, a door ajar indicator, a running light etc.

In operation, the badge 22 may exhibit a constant unicolor or multicolor illumination. For example, the controller 66 may prompt one of a plurality of multicolored light sources 64 within the badge 22 to flash a multitude of colors at a pre-defined interval. Simultaneously, the remaining plurality of light sources 38, 64 may illuminate in a steady unicolor, may flash through a multitude of colors, and/or be placed in an off state by the controller 66. In one embodiment, the controller 66 is configured to make each multicolored light source 64 randomly illuminate in a red color, followed by a blue color, followed by a green color, or combinations thereof. The controller 66 may rapidly illuminate each light source 38, 64 in any color. For example each light source 38, 64 may illuminate for $\frac{1}{50}$ to $\frac{1}{100}$ of a second. Also, the controller 66 may vary power to each light source 38 from 1 to 5 times steady state current to vary the color and brightness of each illumination. The controller 66 may also illuminate multiple colors within a single multicolored light source 64 concurrently, thereby producing additional color configurations.

In another embodiment, the photoluminescent portion 36 may exhibit periodic unicolor or multicolor illumination. For example, the controller 66 may prompt light source 38 to periodically emit only the first wavelength of light to cause the photoluminescent structure 10 to periodically illuminate in the first color. Alternatively, the controller 66 may prompt the light source to periodically emit only the second wavelength of light to cause the photoluminescent structure 10 to periodically illuminate in the second color. Alternatively, the controller 66 may control the light source 38 to simultaneously and periodically emit the first and second wavelengths of light to cause the photoluminescent structure 10 to periodically illuminate in a third color defined by an additive light mixture of the first and second colors. Alternatively still, the controller 66 may control the light source 38 to alternate between periodically emitting the first and second wavelengths of light to cause the photoluminescent structure 10 to periodically illuminate by alternating between the first and second colors. The controller 66 may control the light source 38 to periodically emit the first and/or second wavelengths of light at a regular time interval and/or an irregular time interval. A multicolored light source 64 may also illuminate between discrete colors at a pre-defined interval simultaneously with the photoluminescent structure 10. Thus, the badge 22 may appear in any color based on a combination of photoluminescent structures 10 while simultaneously having set points flicker in multiple different colors to create a prismatic appearance within the badge 22.

With respect to the above examples, the controller 66 may modify the intensity of the light emitted from the light sources 38 by pulse-width modulation or current control. In some embodiments, the controller 66 may be configured to adjust a color of the emitted light by sending control signals to adjust an intensity or energy output level of any of the light sources 38, 64. By adjusting the range of intensities that may be output from light source 38, the concentration and proportions of the photoluminescent structures 10 in the photoluminescent portion 36 and the types of photoluminescent materials utilized in the photoluminescent portion 36 may be operable to generate a range of color hues of the emitted light by blending the first emission with the second emission. Additionally, varying the range of intensities of the multicolored light sources 64 may accentuate any appearance features (e.g., prismatic appearance) of the badge 22.

Accordingly, an illuminating badge for a vehicle has been advantageously described herein. The badge provides various benefits including an efficient and cost-effective means to produce illumination that may function as a distinct styling element that increases the refinement of a vehicle, or any other product that may have a badge disposed thereon.

It is also important to note that the construction and arrangement of the elements of the disclosure as shown in the exemplary embodiments are illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown in multiple parts may be integrally formed, the operation of the interfaces may be reversed or otherwise varied, the length or width of the structures and/or members or connectors or other elements of the system may be varied, the nature or number of adjustment positions provided between the elements may be varied. It should be noted that the elements and/or assemblies of the system might be constructed from any of the wide variety of materials that provide sufficient strength or durability, in any of the wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. A badge for a vehicle, comprising:
   a housing of said badge having a prismatic viewable portion; and
   first and second light sources disposed inside the housing each configured to direct light toward the viewable portion, the second light source disposed between the first light source and the viewable portion;
   wherein the viewable portion illuminates in a first color from the first light source and simultaneously in a second color from the second light source.

2. The badge of claim 1, wherein the first light source is disposed proximate at least one of an outer edge and a corner of the viewable portion.

3. The badge of claim 1, wherein the badge further comprises a light diffusing material proximate the viewing portion.

4. The badge of claim 1, wherein the first light source illuminates in a substantially white color and wherein the second light source illuminates in a non-white color.

5. The badge of claim 4, wherein the first light source illuminates while the second light source is in an off state.

6. A vehicle badge, comprising:
   a prismatic viewable portion of the badge;
   a first light source configured to emit light toward the viewable portion; and
   a second light source located between the viewable portion and the first light source and configured to pulse light toward the viewable portion;
   wherein the viewable portion is configured to luminesce in response to excitation by light emitted from the first light source; and
   wherein pulsed light emitted from the second light source produces a plurality of colors on the viewable portion.

7. The badge of claim 6, wherein the second light source is disposed proximate at least one of an outer edge and a corner of the viewable portion.

8. The badge of claim 6, wherein the viewable portion includes a photoluminescent structure configured to perform an energy conversion on light emitted from the first light source.

9. The badge of claim 6, further comprising a controller configured to control the output of each light source, wherein each light source illuminates in a differing color to create a prismatic appearance.

10. The badge of claim 9, wherein the viewable portion luminesces in a neutral white color.

11. The badge of claim 6, wherein each pulse of light from the second light source occurs for a time period of about 1/10 to 1/100 of a second.

12. A vehicle badge, comprising:
   a housing of the badge having a prismatic viewable portion; and
   first and second light sources disposed inside the housing and each configured to direct light toward the viewable portion;
   wherein portions of the viewable portion are configured to glow in a first color and flash in a second color that is visually distinct from the first color, wherein the second light source is disposed between the first light source and the viewable portion.

13. The badge of claim 12, wherein the second light source is cycles through a plurality of colors.

14. The badge of claim 12, wherein the second light source is disposed proximate at least one of an outer edge and a corner of the viewable portion.

15. The badge of claim 12, wherein the viewable portion includes a light diffuser.

16. The badge of claim 12, wherein the first light source is one of an ultraviolet LED, a violet LED, and a blue LED, and the second light source is a Red, Green, and Blue (RGB) LED.

17. The badge of claim 16, wherein the first and second light sources are RGB LEDs and wherein the first light source illuminates all three color chips within the RGB LED while the second light source simultaneously illuminates less than all three color chips disposed within the RGB LED.

18. The badge of claim 13, wherein each pulse of light from the second light source occurs for a time period of about 1/10 to 1/100 of a second.

* * * * *